United States Patent [19]

Efron et al.

[11] Patent Number: 5,759,447
[45] Date of Patent: Jun. 2, 1998

[54] ERASABLE OPTICAL MEMORY AND METHOD

[75] Inventors: Uzi Efron; Chiung-Sheng Wu, both of Los Angeles; Larry Raymond Dalton, Monterey; Eli Wiener-Avnear, Carlsbad, all of Calif.

[73] Assignee: Hughes Electronics Corporation, El Segundo, Calif.

[21] Appl. No.: 577,604

[22] Filed: Dec. 22, 1995

[51] Int. Cl.[6] .............................. F21V 9/00; G03C 11/00; G03C 1/00
[52] U.S. Cl. .................... 252/582; 252/587; 252/589; 430/19; 430/495.1; 430/503
[58] Field of Search ........................... 252/582, 587, 252/589; 430/19, 495.1, 503

[56] References Cited

U.S. PATENT DOCUMENTS

| | | | |
|---|---|---|---|
| 4,728,724 | 3/1988 | Jones, Jr. | 430/19 |
| 5,480,749 | 1/1996 | Green | 430/19 |
| 5,641,846 | 6/1997 | Bieringer et al. | 430/19 |

OTHER PUBLICATIONS

S. Arnold et al., "Room Temperature Microparticle-Based Persistent Spectral Hole Burning Memory", *Optics Letters*, vol. 16, pp. 420–422 (1991).

D. Zou et al., "Model Filled Polymers I. Synthesis of Crosslinked Monodisperse Polystrene Beads", *Journal of Polymer Science, Part A: Polymer Chemistry*, vol. 28, pp. 1909–1921 (1990).

C. Xu et al., "Stabilization of the Dipole Alignment of Poled Nonlinear Optical Polymers by Ultrastructure Synthesis", *Macromolecules*, vol. 26, pp. 5303–5309 (1993).

C. Xu et al., "Main–Chain Second–Order Nonlinear Optical Polymers: Random Incorporation of Amino–Sulfone Chromophores", *Chemistry of Materials*, vol. 5, pp. 1439–1444 (1993).

G.K.S. Prakash et al., "Oxyfunctionalization of Hydrocarbons; 15 Electrophillic Hyroxylation of Aromatic with Sodium Perborate/Trifluromethanesulfonic Acid", *SYLLETT*, vol. 1, pp. 39–40, (1991).

G.A. Olah et al., "Triflic Acid Catalized Phenylamination of Aromatics with Phenyl Azide", *Journal of Organic Chemistry*, vol. 58, pp. 6900–6901 (1993).

L. d'Auria et al., "Experimental Holographic ReadOut Memory Using 3–D Storage", *Applied Optics*, vol. 13, No. 4, pp. 808–818 (1974).

J.E. Weaver et al., "Evaluation Experiments on Holographic Storage of Binary Data in Electro–Optic Crystals", *Optical Engineering*, vol. 20 No. 3, pp. 404–411 (1981).

S. Hunter et al., "Potentials of Two–Photon Based 3–D Optical Memories for High Performance Computing", *Applied Optics*, vol. 29, pp. 2058–2066 (1990).

J.H. Strickler et al., "Three Dimensional Optical Data Storage in Refractive Media By Two–Photon Point Excitation", *Optics Letters*, vol. 16, pp. 1780–1782 (1991).

U.P. Wild et al., "Hole Burning, Stark Effect and Data Storage", *Applied Optics*, vol. 24, No. 10, pp. 1526–1530 (1985).

*Primary Examiner*—Philip Tucker
*Attorney, Agent, or Firm*—V. D. Duraiswamy; W. K. Denson-Low

[57] ABSTRACT

An erasable optical memory is provided by an erasable bistable photoactive chromophore that is covalently bonded to a polymer microsphere. An azobenzene chromophore that is bonded to the microsphere by an oxygen or NH replacement of chlorine, or a CH double bond to N, is preferred. An array of such microspheres is encoded by applying radiation at a resonant wavelength to induce a conformational change in the chromophores for selected microspheres, and the encoded pattern is read out by detecting changes in either absorption or fluorescence.

22 Claims, 5 Drawing Sheets

ERASABLE OPTICAL MEMORY AND METHOD

GOVERNMENT RIGHTS

This invention was made with Government support under Contract F30602-93-C-0158 awarded by the Air Force. The Government has certain rights in this invention.

BACKGROUND OF THE INVENTION

1. Field of the Invention

This invention relates to optical memories, and more particularly to erasable bistable memories formed on microspheres.

2. Description of the Related Art

Numerous optical memory systems have been proposed for high density applications. These include two-dimensional magneto-optical memories, which exhibit a high density with a pixel size close to the optical diffraction limit and are capable of read, write and also memory erase operations. However, these memories have a low signal-to-noise ratio, a low data coding speed because of thermal recording, a pixel size that is limited by thermal capacity and conductivity, a high degree of cross-talk due to thermal diffusion, a requirement for time consuming sequential data coding, environmental instabilities and a susceptibility to external magnetic fields.

Volume hologram optical memories take a different approach, as described in L. d'Auria et al., "Experimental Holographic ReadOut Memory using 3-D Storage", *Applied Optics*, Vol. 13, No. 4, pages 808–818 (1974) and J. E. Weaver et al., "Evaluation Experiments on Holographic Storage of Binary Data in Electro-Optic Crystals", *Optical Engineering*, Vol. 20, No. 3, pages 404–411 (1981). While these memories have the potential for a high memory density and an inherently parallel access to coding and readout, they suffer from cross-talk between multiple volume holograms, a difficult angular selectivity to data coding and data readout, a low diffraction efficiency of multiple holograms, and data volatility.

3-D two-photon excitation optical memories are described in S. Hunter et al., "Potentials of Two-Photon Based 3-D Optical Memories for High Performance Computing", *Applied Optics*, Vol. 29, pages 2058–2066 (1990) and J. H. Strickler et al., "Three Dimensional Optical Data Storage in Refractive Media By Two-Photon Point Excitation", *Optics Letters*, Vol. 16, pages 1780–1782 (1991). These memories have a high density 3-D coating and can operate at ambient temperatures, but have the disadvantages of a non-linear optical reaction, a critical optical focus control in which it is difficult to select the desired active layer, non-erasability of encoded data and a difficulty in accessing data in parallel.

Another approach, described in W. E. Moerner, ed. "Persistent Spectral Hole Burning Science and Applications", Spring-Verlag, New York 1988 and U. P. Wild et al., "Hole Burning, Stark Effect and Data Storage", *Applied Optics*, Vol. 24, No. 10, pages 1526–1530 (1985), provides narrow resonance bands with a correspondingly large frequency multiplexing capability. On the other hand, these memories require cryogenic operating temperatures, and exhibit data volatility and a slow thermal erasing rate.

Yet another memory system is based upon morphology dependent resonance (MDR), in which photoactive chromophores are physically adsorbed on (but not chemically attached to) the surfaces of microspheres. The size of the underlying microsphere establishes a resonant wavelength for the chromophore; when excited by a beam at this wavelength the chromophore changes state so that it fluoresces and absorption characteristics change. Individual microspheres within an array of such chromophore-coated microspheres can be provided with slightly different diameters, so that each separate memory element resonates and changes state at a different resonant wavelength. The array is written to with a beam that includes the resonant wavelengths for the microspheres to be encoded (typically corresponding to a shift from a logic "zero" to a logic "one") but excludes the resonant wavelengths for the other microspheres. The chromophores for the microspheres that have been resonated during the writing process are photochemically modified, and therefore no longer absorb at their original writing wavelengths. A different absorption for these chromophores is therefore detected at their original writing wavelengths during readout, and from this the pattern of activated microspheres can be determined.

MDR memories are described by S. Arnold in the summaries of papers from "Persistent Spectral Hole Burning: Science and Applications", Topical Meeting, Sept. 26–28, 1991, Monterey, Calif., pages 134–137, *The Optical Society of America*, Washington, D.C., 1991 Technical Digest Series, Vol. 16, and in S. Arnold et al., "Room Temperature Microparticle-Based Persistent Spectral Hole Burning Memory", *Optics Letters*, Vol. 16, pages 420–422 (1991). Their use of frequency-domain coatings results in a high density memory array that can operate at ambient temperatures. However, these memories are not erasable and, when once written, cannot be rewritten.

SUMMARY OF THE INVENTION

The present invention seeks to provide a novel optical memory system, and associated fabrication and operating methods, that has a high memory density and data coding speed, low levels of noise and cross-talk and an ambient temperature operation, and yet is erasable so that its coding pattern can be changed.

These goals are achieved by covalently bonding erasable bistable photoactive chromophores to respective polymer microspheres. Rather than chemically decomposing when illuminated at its microsphere's resonant wavelength, the chromophore undergoes a change of state that changes its fluorescence and/or absorption characteristics, but can be restored to its original response state by illumination at an erase wavelength. An array of such microspheres with slightly different diameters can be provided as in prior MDR systems to form a spatial array with a rapid writing and readout capability. However, the use of an erasable chromophore with a covalent bond to the underlying microsphere avoids a chemical decomposition of the chromophore during resonance, and allows it to be restored to its original state by illumination at an erase wavelength. For even higher memory density the microspheres can be provided in a 3-D array of microsphere layers, with the microspheres at each depth in the array sized different from the microspheres at other depths.

In a preferred embodiment the chromophore comprises an azobenzene, preferably azobenzene amphiphile. The surface of the polymer microsphere, which is preferably polystyrene, is functionalized with a hydroxyl group that provides an oxygen replacement for chlorine in the azobenzene, or with an amine group that provides an NH replacement for chlorine in the azobenzene. Activated chromophores are detected either by detecting changes in their fluorescence, or in their absorption characteristics.

DETAILED DESCRIPTION OF THE INVENTION

The new erasable optical memory provided by the invention uses the optical frequency domain to extend conventional memory encoding capabilities. It employs MDR which, at ambient temperature, exhibits homogeneous sharp lines for the resonant interaction of light with high precision microspheres. An inhomogeneous distribution of multiple narrow band resonances, representing slight changes in the microsphere sizes, results in a broad overlapped spectrum composed of separate but slightly shifted individual resonances. Bistable memory dye molecules (chromophores) are attached to the surfaces of high precision microspheres in a distribution of microsphere sizes. With properly chosen dye molecules, the writing photons interact with the molecular electrons and transform the dye molecules to the encoded isomeric phase. This is a reversible phase transformation that induces a change in the chemical configuration of the dye and results in a different spectral signature for the microspheres that have resonated. The isomerization occurs resonantly in only one particular microsphere morphology within the selected spectral band. This writing process causes the elimination of the particular energy resonance from the inhomogeneous distribution, due to the photochemical process. The frequency-encoded information is then used for subsequent memory readout. Memory erasure is based upon the reversible photochemical isomerization of the dye molecules.

Virtually any polymer can be used for the microspheres, although polystyrene is preferred. Microspheres of controlled dimensions are prepared utilizing surfactant-free emulsion polymerization, as described in D. Zou et al., "Model Filled Polymers I. Synthesis of Crosslinked Monodisperse Polystrene Beads", *Journal of Polymer Science, Part A: Polymer Chemistry*, Vol. 28, pages 1909–1921 (1990). This process involve the polymerization of vinylbenzene and divinylbenzene. Divinylbenzene effects crosslinking between polymer chains and stabilizes the microsphere structures which form naturally because of an incompatibility between the polymer and solvent. The sizes of the microspheres increase uniformly as a function of their growth times, so that microspheres of different dimensions can be prepared by terminating the reaction after different reaction times; the different microspheres will accordingly resonate at slightly differing wavelengths. In this manner a particular microsphere can be written to, without writing to other microspheres in the array, by selecting a writing wavelength equal to one of its particular resonant wavelengths. These wavelengths produce a morphological resonance, which amplifies the writing field sufficiently to produce a change of state for the dye.

A dye in the form of an erasable bistable photoactive chromophore is then covalently bonded to each of the microspheres. Azobenzenes are preferred chromophores for this purpose, but other materials which undergo photo-induced keto-enol-keto tautomerism and photo-induced reversible ring opening/closing are also candidates for the reversible photochromic reaction. The general procedure for azobenzene synthesis is described in C. Xu et al., "Stabilization of the Dipole Alignment of Poled Nonlinear Optical Polymers by Ultrastructure Synthesis", *Macromolecules*, Vol. 26, pages 5303–5309 (1993) and C. Xu et al., "Main-Chain Second-Order Nonlinear Optical Polymers: Random Incorporation of Amino-Sulfone Chromophores", *Chemistry of Materials*, Vol. 5, pages 1439–1444 (1993). Not all azobenzenes have been found to be suitable for the invention. Acceptable azobenzenes should (1) be reactive with a functionalized form of the microsphere material to establish covalent bonds with the microsphere surface, and (2) be highly fluorescent, since fluorescence detection is the preferred readout technique for the invention. Azobenzene amphiphile satisfies both of these requirements.

Figure 1:
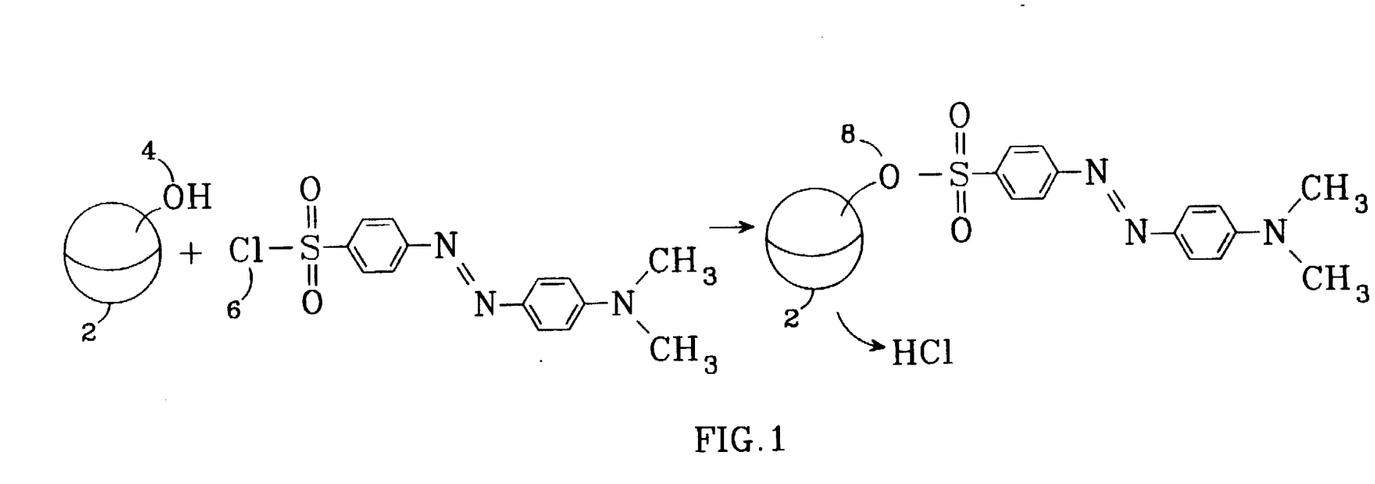
FIGS. 1, 2 and 3 are chemical diagrams illustrating alternate procedures for covalently coupling erasable memory chromophores to polymer microsphere surfaces in accordance with the invention.
Figure 2:
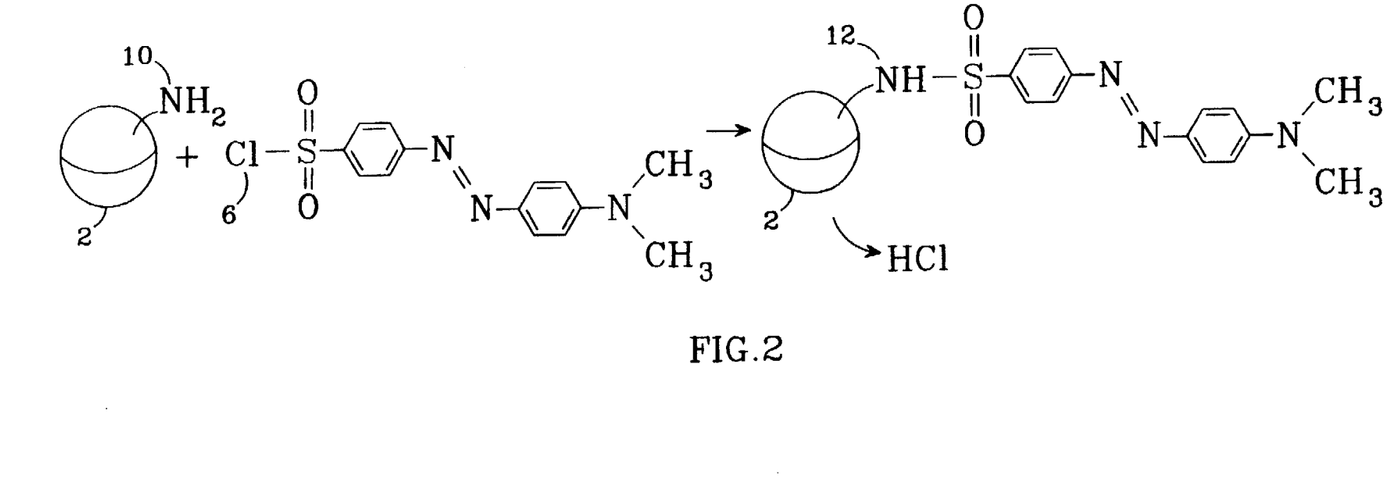

The surface of the polymer microsphere must be functionalized, that is, it must be made reactive with the chromophore material. At least two alternate techniques may be used to functionalize polymers such as polystyrene. The first uses the approaches described in G. K. S. Prakash et al., "Oxyfunctionalization of Hydrocarbons; 15 Electrophillic Hyroxylation of Aromatic with Sodium Perborate/Trifluromethanesulfonic Acid", *SYLLETT*, Vol. 1, pages 39–40 (1991) or G. A. Olah et al., "Triflic Acid Catalyzed Phenylamination of Aromatics with Phenyl Azide", *Journal of Organic Chemistry*, Vol. 58, pages 6900–6901 (1993) to functionalize the surfaces of the microspheres with hydroxyl or amine groups. Functionalization with an OH hydroxyl group is illustrated in FIG. 1, and with an $NH_2$ amine group in FIG. 2. A polystyrene microsphere 2 is first prepared in the normal way by the surfactant-free polymerization of styrene (vinylbenzene) and divinylbenzene. The surface of each polystyrene microsphere is then functionalized. The hydroxylization procedure illustrated in FIG. 1 follows the formula:

$$(PSMS)+NaBO_3(4H_2O) \rightarrow (PSMS)-(OH)_x \quad (1)$$

where PSMS stands for polystyrene microspheres. Functionalization with amine groups as illustrated in FIG. 2 follows the formulas:

$$Me_3SiN_3+2F_3CSO_3H \rightarrow NH_2N_2+{}^-OSO_2CF_3+Me_3SiOSO_2CF_3 \quad (2)$$

and $$(PSMS)+NH_2N_2+{}^-OSO_2CF_3 \rightarrow (PSMS)-(NH_2)_x \quad (3)$$

As an alternate to the two-step approach of first forming microspheres and then functionalizing them, functionalized microspheres can be produced in a single step by modifying the Prakash/Olah procedures so as to replace the styrene or vinylbenzene monomer with 4-hydroxstyrene or 4-aminostyrene to directly produce polymer microspheres with reactive hydroxyl or amine functionalities on their surfaces. This procedures follows the formula:

$$4\text{-hydroxystyrene}+\text{vinylbenzene} \rightarrow (PSMS)-(OH)_x \quad (4)$$

Once microspheres with functionalized surfaces have been provided, an azobenzene chromophore that has been modified to contain a reactive functionality (an acyl chloride, sulfronyl chloride or isocyanate group) is reacted with the functionalized microspheres and covalently coupled by a condension reaction to the microsphere surfaces. For hydroxilized microsphere surfaces prepared by either formula (1) or (4) the reaction follows the formula:

$$\text{PSMS}-(\text{OH})_x+\text{Cl}-\text{S}(=\text{O})_2\text{-Chromophore}\rightarrow\text{PSMS}-\text{O}-(\text{S}=\text{O})_2\text{-Chromophore}. \quad (5)$$

This reaction is illustrated in FIG. 1, in which a hydroxide 4 on the microsphere surface reacts with a chlorine atom 6 in the chromophore to produce a replacement of the chlorine atom with oxygen 8 that is covalently bonded to the microsphere, with HCl given off.

FIG. 2 illustrates the corresponding reaction with an aminized microsphere surface. The amine $NH_2$ 10 reacts with the chromophore chlorine atom 6 to replace the chlorine with NH 12, again giving off Hcl. This reaction follows the formula:

$$\text{PSMS}-(\text{NH}_2)_x+\text{Cl}-\text{S}(=\text{O})_2\text{-Chromophore}\rightarrow\text{PSMS}-\text{O}-(\text{S}=\text{O})_2\text{-Chromophore}. \quad (6)$$

The azobenzene chromophore can itself be functionalized to permit the coupling of subsequent layers of chromophores. The flexibility of the covalent coupling of chromophores to polymer microsphere surfaces can be systematically altered by increasing the number of methylene groups between the sulphur and chlorine atoms of the chromophore.

Figure 3:
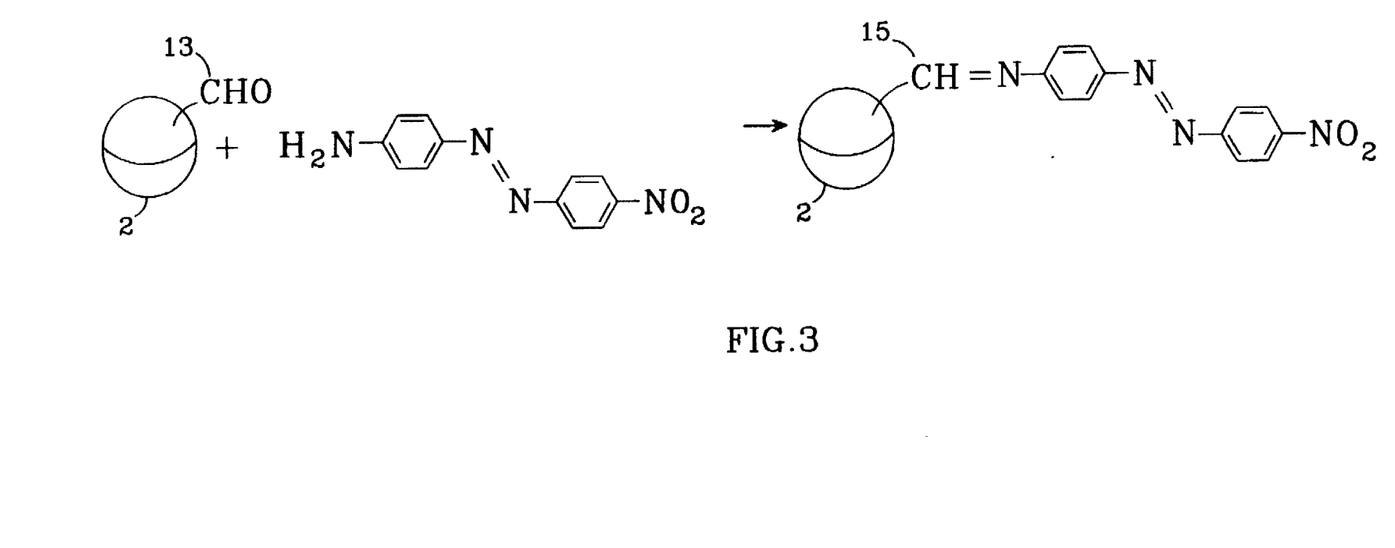

FIG. 3 illustrates functionalization of the microsphere with an aldehyde CHO 13, which is more compatible with organic solvents than is a hydroxyl or an amine. In this case a covalent bond is established with a 4amino4' nitro azobenzene chromophore by a CH15 double bond linkage to N, following the formula:

$$\text{PSMS}-\text{CHO}+\text{H}_2\text{N-Chromophore}\rightarrow\text{PSMS}-\text{CH}=\text{N-Chromophore}, \quad (7)$$

with water given off.

When resonated by exposure to radiation at a resonant wavelength of the microsphere to which it is attached, the chromophores undergo an isomeric change that results in a change in their optical constants. Since the induced isomerization occurs in only one particular microsphere morphology, it is possible to selectively photolyze the chromophores attached to the microspheres that match a given MDR condition. The photo-induced conformational change that occurs for azobenzene-type chromophores is a trans-to-cis isomerization. The kinetics of this change, and hence the optical memory writing speed, depend upon the nature of the tether which secures the chromophore to the microsphere surface; long tethers in general allow for a faster transformation with a lower level of input optical energy. Readout of the encoded information can be achieved by scanning the frequency of a narrow band, low intensity level light source and in-situ monitoring either the light absorption or the characteristic fluorescence. In general, photolysis causes a reduction in fluorescence and the selective isomerization will create "holes" at the corresponding writing wavelengths in the excitation spectrum.

Figures 4, 5:
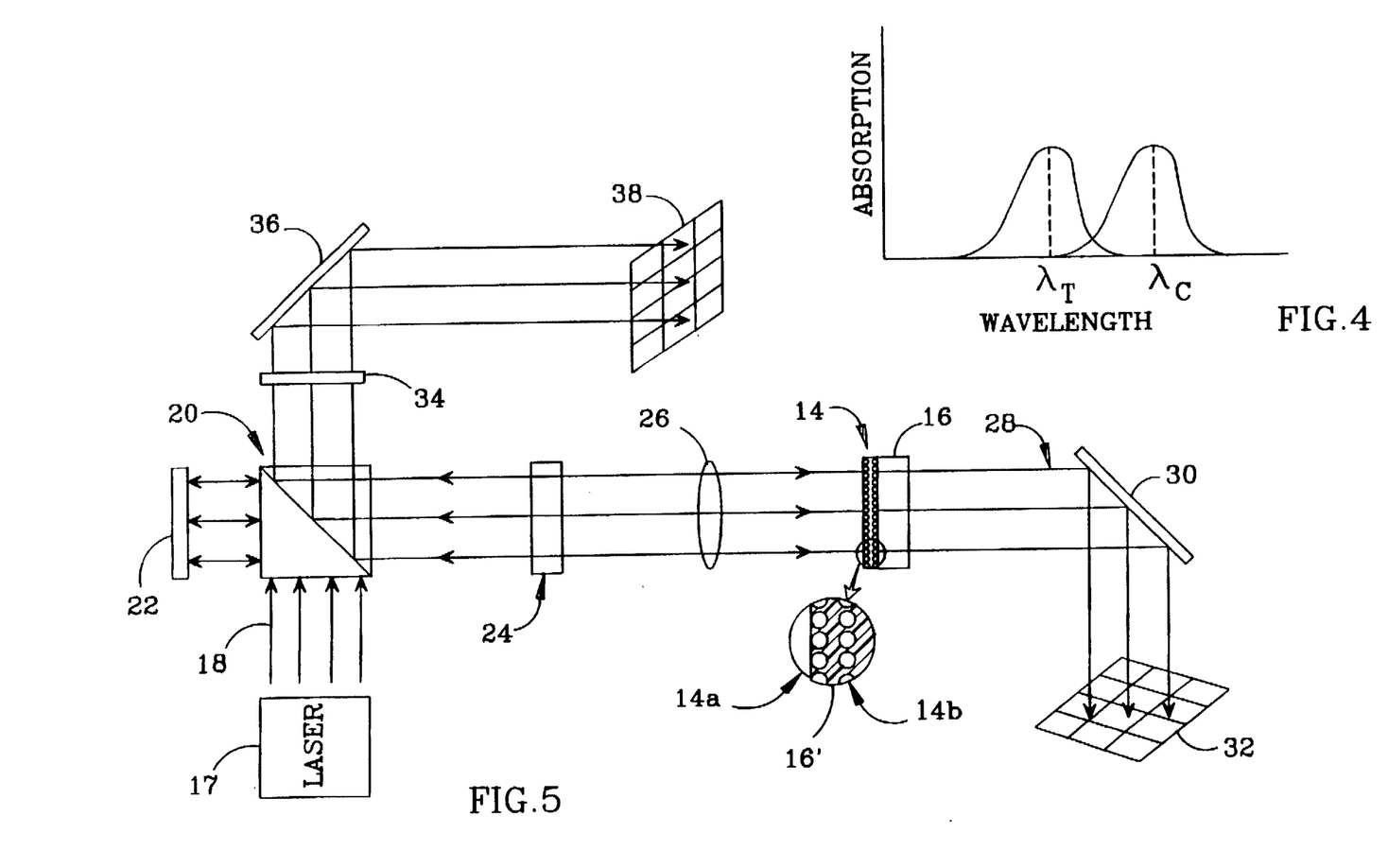
FIG. 4 is a graph illustrating the optical response of a memory chromophore such as those illustrated in FIGS. 1–3, before and after a photo-induced conformational change of state.
FIG. 5 is a block diagram of a system that can be used to write, read and erase an array of erasable memory microspheres that have been fabricated as illustrated in FIGS. 1–3.

The trans and cis molecular conformations represent two different orientations of the azobenzene molecule in space. FIG. 4 illustrates the type of wavelength shift in absorption that accompanies an azobenzene trans-to-cis isomerization. In the trans state the absorption is centered on a particular wavelength $\lambda_T$. In response to a conformational change to a cis state, the center of the absorption band shifts to a new wavelength $\lambda_C$. The cis state of an azobenzene absorbs more to the UV than does the trans state.

FIG. 5 shows in block diagram form a system that uses the invention to optically encode, read from memory and then erase memory so that new information can thereafter be written in. An array of microspheres 14 to which bistable erasable chromophores have been covalently bonded are embedded in a substrate 16 that is transparent to light at the readout wavelength(s). Silica (glass) or various polymer matrices such as polystyrene could be used for the substrate. In the illustration of FIG. 5, the microspheres are arranged in two planar arrays 14a and 14b, separated by a layer 16' of the substrate material. In this 3-D array all of the microspheres in layer 14a can be one size and all of the microspheres in layer 14b can be a second size, in which case layer 14a is encoded by a spatial pattern of illumination at a single wavelength (or more accurately, a single narrow waveband) that causes resonation of the illuminated microspheres in layer 14a but not 14b, and similarly the microspheres in layer 14b are encoded with a spatial pattern of illumination at a different single wavelength that causes the illuminated microspheres in layer 14b but not in 14a to resonate. Alternately, the microspheres in layer 14a could all have slightly different sizes within a first size range and the microspheres in layer 14b could have slightly different sizes in a different size range that does not overlap the size range for layer 14a. In this case the arrays would be selectively encoded by illuminating them with light that includes resonant wavelengths for the microspheres to be encoded, but not for the other microspheres. The microspheres in each layer could also have different chromophores than the microspheres in the other layers. In this way each layer could be erased individually with different monochromatic wavebands.

In a writing operation based upon the first approach, in which all of the microspheres within a given layer are the same size, a laser 17 directs a beam 18 onto a polarizing beam splitter (PBS) 20, which redirects the beam onto a reflective spatial light modulator (SLM) 22. The SLM is encoded with a pattern of spatial information that is to be written into the optical memory 14. Those pixels on the SLM which spatially correspond to the microspheres in array 14 to be encoded reflect the writing beam 18 back through the PBS to a 45° polarization rotator 24; the SLM pixels that spatially correspond to microspheres which are not to be encoded are deactivated and do not reflect their respective portions of the writing beam. SLM 22 can be implemented with a conventional liquid crystal light valve that is encoded either optically or electrically; such devices are well known.

After emerging from the polarization rotator 24, the writing beam is focused by a lens 26 onto the microsphere array 14, causing those microspheres that spatially correspond to the activated pixels in the SLM to resonate and change the state of their associated chromophores. This results in a spatial pattern of encoded microspheres that is used to store the data received from SLM 22.

The microsphere array retains its encoded pattern until it is later erased. This pattern can be read out by observing changes in either the optical absorption or the fluorescence pattern of the array, on a pixelized basis. As mentioned above, the chromophore's absorption at the writing wavelength is reduced after it has undergone a trans-to-cis isomerization, and its fluorescence at the original fluorescence waveband is also reduced. The encoded memory pattern can thus be read by observing the absorption pattern of the microsphere array at the original writing wavelength to detect microspheres whose absorption has decreased, or by monitoring the array's fluorescence at either the original or the shifted fluorescence waveband. The encoded microspheres will fluoresce less than the non-encoded microspheres at the original fluorescence waveband, and more at the shifted fluorescence waveband.

To read the memory using its absorption characteristic, laser 17 is maintain at its original writing wavelength. The SLM 22 is fully activated so that all of its pixels reflect the laser beam into a full readout beam that is directed onto the microsphere array 14. Non-encoded microspheres absorb more of the incident light from this beam, while the encoded microspheres absorb less. The beam 28 that emerges from the microsphere array is thus encoded in a manner that corresponds to the memory pattern. This beam is deflected by a mirror 30 onto an imager 32 that is pixelized in a manner corresponding to the positions of the microspheres in the array 14, with each imager pixel detecting the intensity of light from its corresponding microsphere position. The pattern of lower intensity pixels detected by the imager 32 corresponds to the pattern of encoded microspheres.

To read out the microsphere array by its fluorescence characteristics, laser 17 is again maintained at the original writing wavelength, and all of the pixels of SLM 22 are again activated so that the microsphere array is fully illuminated. Florescent emissions from the individual microspheres are collimated by lens 26, and their polarization is rotated by another 45° in polarization rotator 24. This causes the PBS 20 to redirect the returned fluorescence image to a color filter 34 and onto a mirror 36, which deflects the image to an imager 38. The color filter 34 is tuned to the peak fluorescence waveband of either the encoded microspheres or the non-encoded microspheres; fluorescence typically occurs over a relatively wide waveband. If it tuned to the encoded microspheres, the illumination pattern detected by imager 38 corresponds directly to the pattern of encoded microspheres. If the color filter 34 is tuned to the non-encoded microspheres, the image on imager 38 corresponds to the inverse of the encoding pattern.

The microsphere layers 14a and 14b are read sequentially, with the wavelength of the input laser beam shifted accordingly between the two layers. The 3-D embodiment allows for a higher memory density without adding significantly to the cost, volume or weight of the system.

After it has been read out, the encoded microsphere array 14 can be erased by illuminating it with intense light at an appropriate erase wavelength. The erasure beam transforms the encoded microspheres back into their original configuration phase. In general, the erasure wavelength is quite different from that used for writing. In the case of azobenzene amphiphile, erasure was accomplished by illuminating the microspheres with a wideband UV lamp. Alternately, a UV laser could be substituted for laser 17 and used to erase the microspheres through the optical system of FIG. 5.

Figure 6:
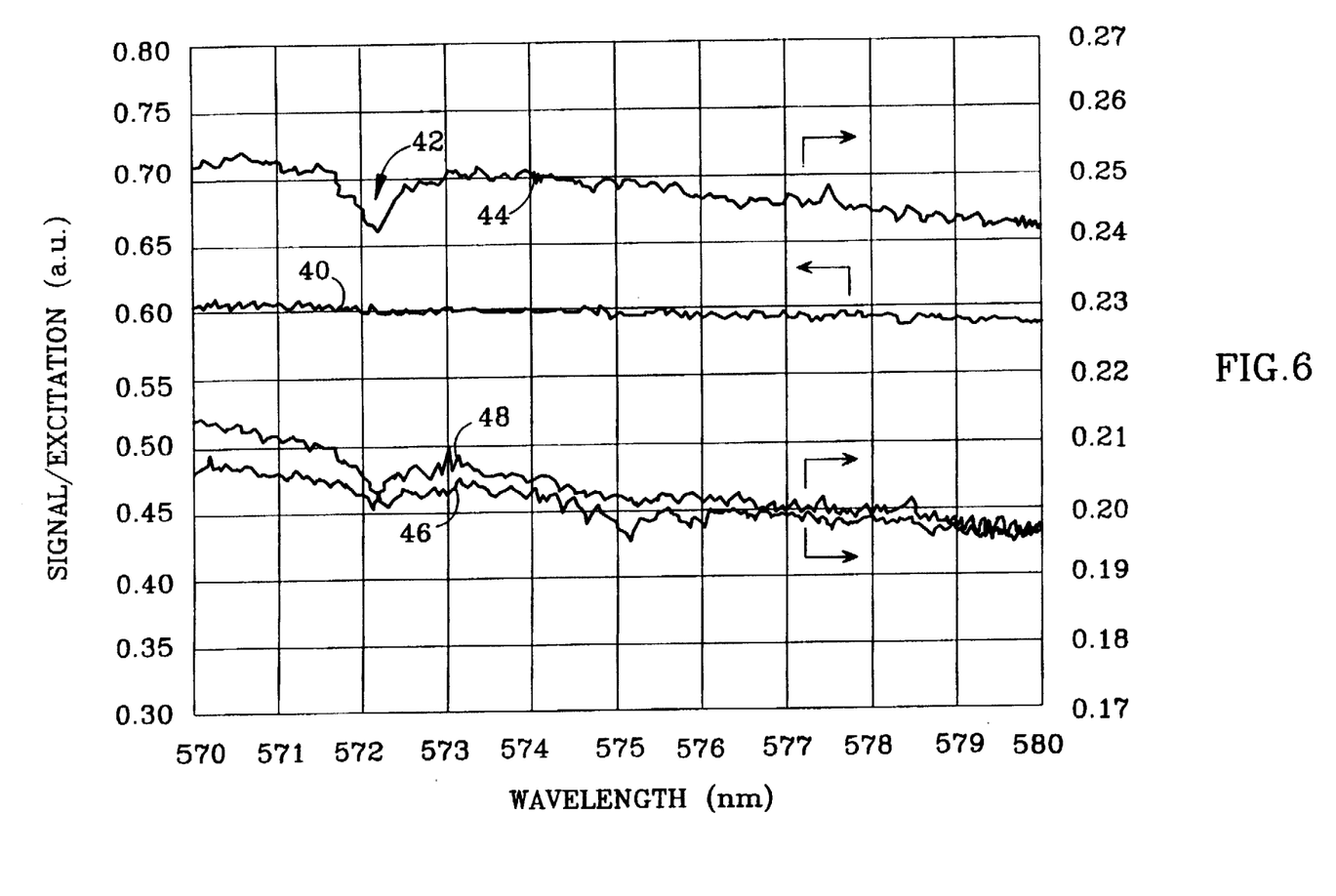
FIGS. 6 and 7 are graphs illustrating the experimental results of writing and erasing in accordance with the invention.

FIG. 6 shows the results of a demonstration of the invention for a distribution of microspheres having an average size of 24 micrometers and a covalently bonded azobenzene amphiphile chromophore. Excitation signals were scanned over a waveband of 570–580 nm, and the total fluorescence over a waveband of approximately 600–800 nm was accumulated for each illumination wavelength. The detected fluorescence signal was normalized to the excitation power. Two different normalized scales are given on the left and right hand vertical axes of the figure; arrows next to each output trace indicate whether it is to be read from the left or right hand scale.

The initial fluorescence response prior to encoding is shown by trace 40, in which there are no obvious dips. The microspheres were then exposed to a 500 mW laser at 575 nm for two minutes. This produced a noticeable dip 42 in the resulting fluorescence curve 44 at about 572 nm. Since a dip in fluorescence would normally be expected in response to the initial resonant excitation wavelength of 575 nm, it is speculated that the gradual change of state imposed upon the chromophores produce a reduction in the overall microsphere size that accounted for a shift in the fluorescence dip from 575 to 572 nm. The fluorescence response after an additional one minute of illumination at 572 nm is shown by trace 46, and the results after the completed sample was kept in the dark for 20 minutes is shown by trace 48.

Figure 7:
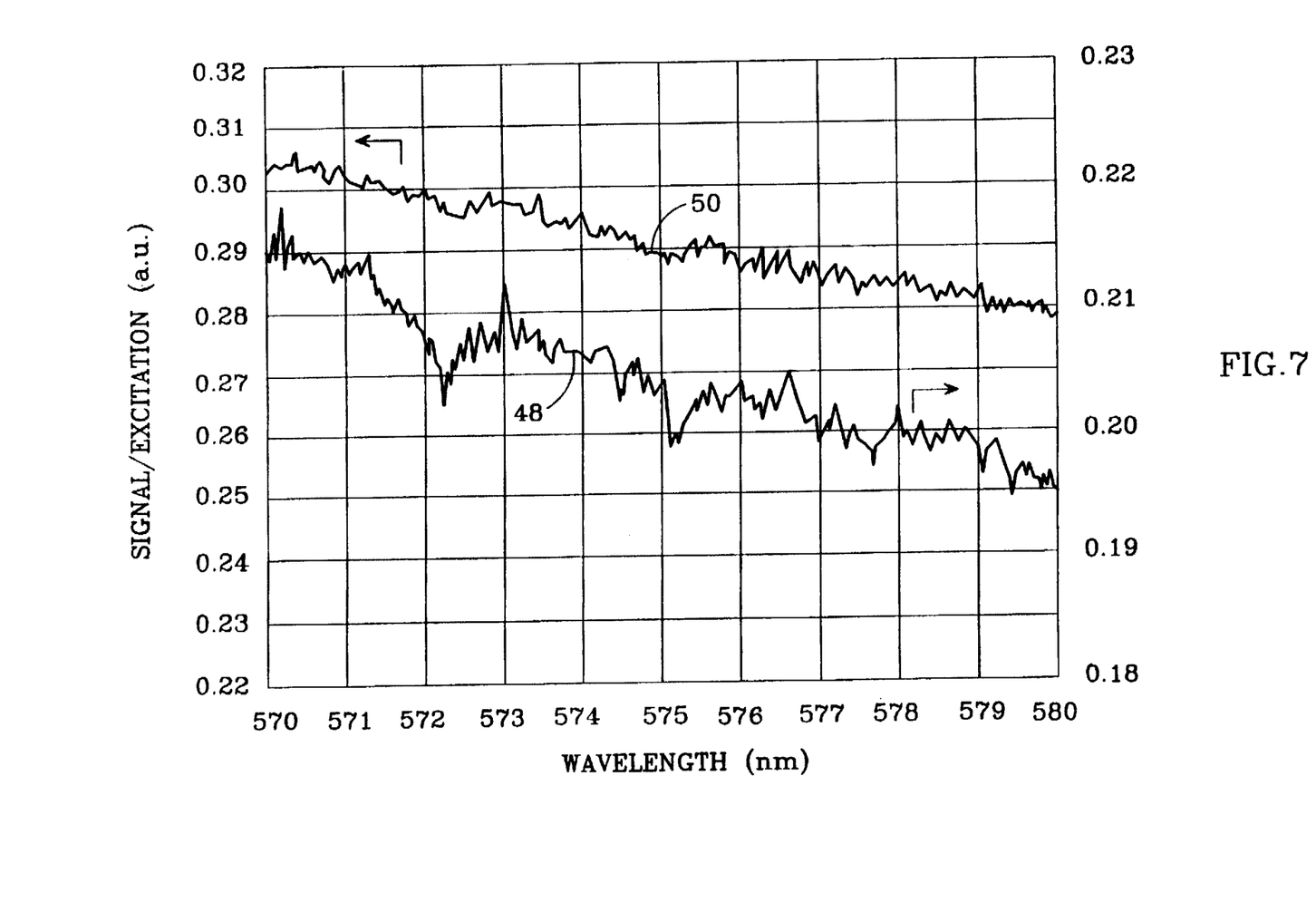

FIG. 7 shows the results of an erase operation for the same sample. Trace 48 is repeated in FIG. 7, but on an expanded scale. The sample was then erased with a UV lamp for 20 minutes, and the resulting fluorescence trace 50 did not exhibit any noticeable dips, either at 572 nm, 575 nm or elsewhere over the excitation band. This confirmed a successful erasure.

The invention thus provides an erasable optical memory that is compact, has a low noise level, a low data volatility, and can be operated at ambient temperature. It is particularly applicable to advanced supercomputers, computer network systems and real time data acquisition/processing and pattern recognition systems that require erasable memory operated at ambient temperature with higher storage density, higher throughput rate and faster access time. Specific applications include a massive storage medium for space-based data storage, parallel access optical memories for the enhancement of parallel computers (including 3-D computers) for image and signal processing, medical image information banks and fingerprint data bands.

While several illustrative embodiments of the invention have been shown and described, numerous variations and alternate embodiments will occur to those skilled in the art. Such variations and alternate embodiments are contemplated and can be made without departing from the spirit and scope of the invention as defined in the appended claims.

We claim:

1. An erasable optical memory, comprising:
   a polymer microsphere, and
   an erasable bistable photoactive chromophore covalently bonded to said microsphere.

2. The erasable optical memory of claim 1, further comprising a spatial array of such polymer microspheres with respective covalently bonded erasable bistable photoactive chromophores.

3. The erasable optical memory of claim 2, wherein as least some of said microspheres have different sizes and establish different resonant wavelengths for their respective chromophores.

4. The erasable optical memory of claim 3, wherein said spatial array is a 3-D array with multiple layers of microspheres at different depths in the array, the microspheres at each depth in the array having sizes different from the microspheres at other depths in the array.

5. The erasable optical memory of claim 4, wherein the microspheres in at least one of said layers have a bonded chromophore with an erase waveband different from the erase waveband for the chromophores bonded to the microspheres in the other layers.

6. The erasable optical memory of claim 1, said chromophore comprising an azobenzene, and said polymer being functionable for said chromophore.

7. The erasable optical memory of claim 6, wherein said chromophore is strongly fluorescent.

8. The erasable optical memory of claim 6, said chromophore comprising azobenzene amphiphile.

9. The erasable optical memory of claim 6, wherein said azobenzene chromophore is covalently bonded to said microsphere by an oxygen replacement of chlorine in the azobenzene.

10. The erasable optical memory of claim 6, wherein said azobenzene chromophore is covalently bonded to said microsphere by an NH replacement of chlorine in the azobenzene.

11. The erasable optical memory of claim 5, wherein said azobenzene chromophore is covalently bonded to said microsphere by a CH double bond to N in the azobenzene.

12. The erasable optical memory of claim 1, wherein said microsphere is formed from polystyrene.

13. An erasable optical memory system, comprising:
   an array of polymer microspheres with erasable bistable photoactive chromophores covalently bonded to said microspheres,
   an optical writing path for applying a writing beam to said array at a wavelength that causes at least some of the chromophores in said array to change state,
   an optical readout path for applying a readout beam to said array at a wavelength at which at least some of the chromophores in said array have different responses, depending upon whether or not they have undergone a change of state,
   an optical detector which responds to a readout beam that has been applied to said array to detect microspheres whose chromophores have undergone a change of state, and
   an optical erase path for applying an erase beam to said array to reset chromophores which have undergone a change of state back to an original state.

14. The erasable optical memory system of claim 13, wherein the sizes of said microspheres are distributed over a predetermined range to establish a corresponding distribution of resonant wavelengths for their respective chromophores, further comprising multiple wavelength beam sources for said writing and readout beams so that said optical detector can detect changes of state for the chromophores of different sized microspheres.

15. The erasable optical memory system of claim 13, said microsphere array comprising a multiple layer 3-D array with the microspheres of each layer in said array extending over a range of sizes that does not overlap with the microsphere size range for the other layers in said array.

16. The erasable optical memory system of claim 13, wherein said optical detector detects changes in the fluorescence of said chromophores corresponding to a change of state.

17. The erasable optical memory system of claim 13, wherein said optical detector detects changes in the optical absorption of said chromophores corresponding to a change of state.

18. The erasable optical memory system of claim 13, said chromophore comprising an azobenzene, and said polymer being functionable for said chromophore.

19. The erasable optical memory system of claim 8, wherein said azobenzene chromophore is covalently bonded to said microsphere by an oxygen replacement of chlorine in the azobenzene.

20. The erasable optical memory system of claim 8, wherein said azobenzene chromophore is covalently bonded to said microsphere by an NH replacement of chlorine in the azobenzene.

21. The erasable optical memory system of claim 8, wherein said azobenzene chromophore is covalently bonded to said microsphere by a CH double bond to N in the azobenzene.

22. The erasable optical memory system of claim 13, wherein said writing, readout and erase paths at least partially overlap.

* * * * *